(12) United States Patent
Uchiba et al.

(10) Patent No.: US 6,912,210 B1
(45) Date of Patent: Jun. 28, 2005

(54) DATA COMMUNICATION SYSTEM AND COMMUNICATION DEVICE USED

(75) Inventors: Makoto Uchiba, Fukuoka (JP); Yoshiyuki Karakawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,844

(22) Filed: Oct. 8, 1998

(30) Foreign Application Priority Data

Oct. 17, 1997 (JP) .............................................. 9-285909

(51) Int. Cl.$^7$ .............................................. H04L 5/22
(52) U.S. Cl. ..................................... 370/300; 370/469
(58) Field of Search ................................ 370/300, 304, 370/310, 321, 465, 470, 474, 509, 335, 350, 453, 457, 503, 506, 464, 466, 469, 700, 395

(56) References Cited

U.S. PATENT DOCUMENTS

| | | | |
|---|---|---|---|
| 5,570,353 A | * | 10/1996 | Keskitalo et al. ........... 370/335 |
| 5,703,880 A | * | 12/1997 | Miura ........................ 370/465 |
| 5,996,008 A | * | 11/1999 | Gardos et al. ............... 709/219 |
| 6,256,334 B1 | * | 7/2001 | Adachi ....................... 370/310 |

FOREIGN PATENT DOCUMENTS

| JP | 63-104534 | 5/1988 |
|---|---|---|
| JP | 1-246942 | 10/1990 |
| JP | 2-246450 | 10/1990 |

* cited by examiner

*Primary Examiner*—Dang Ton
*Assistant Examiner*—Phuc Tran
(74) *Attorney, Agent, or Firm*—Katten Muchin Zavis Rosenman

(57) ABSTRACT

A data communication system is capable of performing data communication by readily changing the ratio of SCN/SD data and DMA data corresponding to each communication and to individual destination devices. The data communication system may include a first communication device and at least one second communication device, connected to said first communication device via a transmission path, said first communication device notifying a transmission frame format to said second communication device, and said first communication device and said second communication device transmitting and receiving data using said notified transmission frame format.

11 Claims, 12 Drawing Sheets

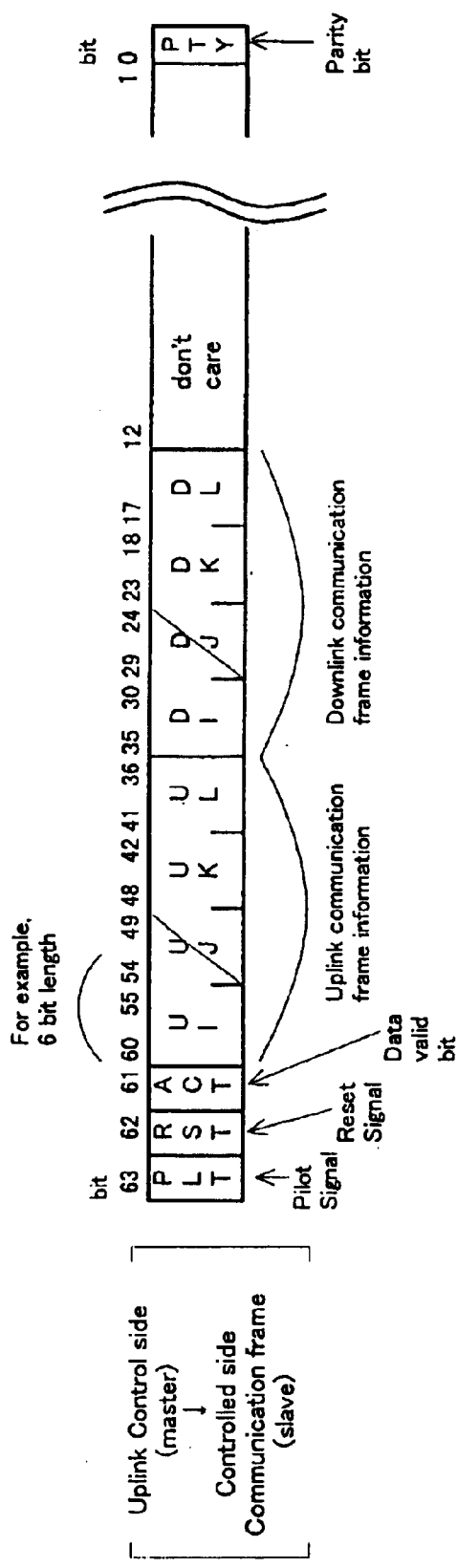
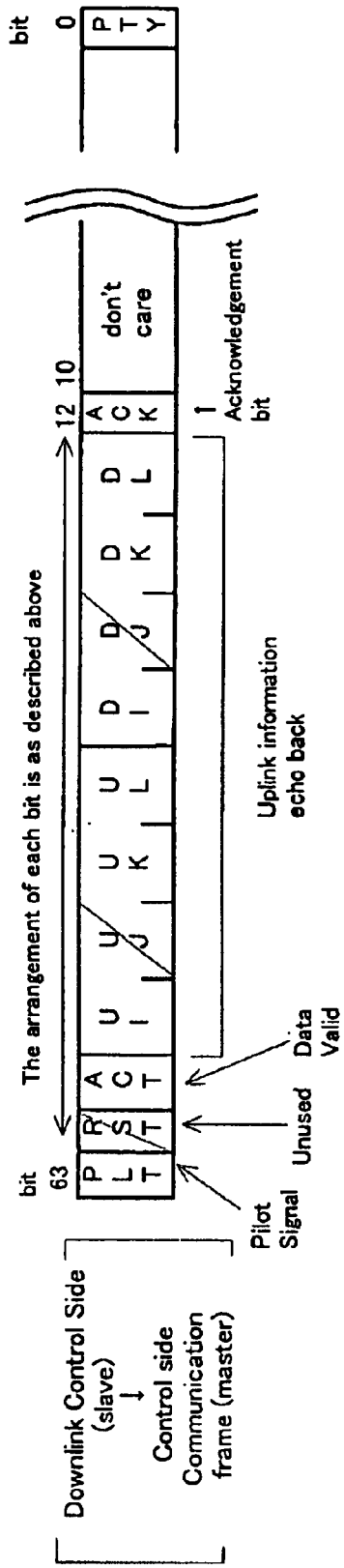

DATA COMMUNICATION SYSTEM AND COMMUNICATION DEVICE USED

BACKGROUND OF THE INVENTION

1. Field of the Invention

The present invention relates to a data communication system, and more particularly to a data communication system capable of varying a transmission frame format corresponding to a data receiver in synchronous point-to-point communications or point-to-multipoint communications, and a data communication controller used therein.

2. Description of the Related Art

Communication equipment to date has mainly sent and received information that can be expressed in bits (SCN/SD data), such as alarm/device blocking (disengagement). By contrast, as a result of the appearance in recent years of Transmission Control Protocol/Internet Protocol (TCP/IP) and Asynchronous Transfer Mode (ATM) cells, the principal data being handled is becoming information that treats a plurality of information as a lump (information in which direct memory access (DMA) information is lumped together with SCN/SD data).

Further, communications are carried out in numerous modes, such as when communications are carried out between devices within an exchange and in a switching system, or a router and a small private branch exchange (PBX) located within a physical distance of around 100 m, or when system equipment such as switches are comprised of a plurality of printed board units, and data is transmitted between these printed board units, or synchronous communications are carried out between large-scale integration (LSI) mounted on a printed board unit.

FIG. 11 depicts a conceptual schematic, which illustrates communications of this kind. The figure indicates data communications being carried out between two printed board units 1, 2. Printed board unit 1 comprises a processor 10 and an LSI 11 controlled thereby.

Printed board unit 2, on the other hand, comprises a plurality of LSI 20 through 22, which receive the various data sent from LSI 11. In addition, each of the plurality of LSI 20 through 22 control corresponding controlled systems 23 through 25.

The data sent from LSI 11 of printed board unit 1 to LSI 20 through 22 of printed board unit 2 is sent by a synchronous-type communications format shown in FIG. 12.

That is, a frame pulse FP is generated in synch with a clock CLK. Each frame pulse FP comprises a single frame. As data, control information, such as frame header information, data stack monitoring information or a loop back signal (a line break monitoring pilot signal), is placed at the beginning of a frame.

Following the control information, SCN/SD data is also included. The meaning of this SCN/SD data is in bit units, and this information must be transferred in an emergency inside a device or system. For example, in-system alarm information and system switching information is utilized. Data characteristics are high speed/low volume.

Next, DMA data is included. A plurality of bits (for example, 16 bits or more) form a meaning of the DMA data, and which is low speed/high volume, such as channel establishment information and rating information. Or, there is ATM setup information, which is held by software/firmware, and when data is written to and read from memory, a large quantity of DMA data is used.

Here, in a system previously developed by the inventors, the length of the above-described control information, SCN/SD data and DMA data are solidly fixed to the respective lengths of j clocks, k clocks and l clocks in the length (i clock length) of a single frame.

Also, as for the SCN/SD data and DMA data, the former has high velocity/low volume characteristics, and the latter has low velocity/high volume characteristics, as described above. Furthermore, the same data is not sent to all of a plurality of devices at the communication destination.

Therefore, in point-to-point communications, when the ratio of SCN/SD data and DMA data have differed for each destination device and each communication, a communication system/procedure had to be develop separately for each situation.

Also, with a view toward a switching system, the ratio of SCN/SD data and DMA data differs according to the size of the exchange and communication volume (for example, the alarm call volume), and with the above frame format, this ratio is fixed, which made it difficult to adequately change in accordance with exchange size and communication volume.

SUMMARY OF THE INVENTION

Therefore, an object of the present invention is to provide a data communication system, which is capable of performing data communications by readily changing the ratio of SCN/SD data and DMA data corresponding to each communication and to individual destination devices, and a data communication controller used therein.

A data communication system that achieves the tasks of the present invention described above comprises a first communication device, and at least one second communication device, which is connected via a transmission path to this first communication device. Then, this data communication system is characterized in that the first communication device notifies a transmission frame format to the second communication device, and data is transmitted and received between the first communication device and the second communication device via this notified transmission frame format.

Further, as one mode, the above-cited transmission frame format is characterized in that one frame comprises a predetermined bit length, and the ratio within the predetermined bit length for a first characteristic data and a second characteristic data can be set arbitrarily.

Further, the above-cited first characteristic data and second characteristic data are characterized in that they are DMA data and SCN/SD data, respectively.

This data communication system is further characterized in that, as one mode, in any of the above-described configurations, when data is transmitted from the above-cited first communication device to the above-cited second communication device, and when data is transmitted from the second communication device to the first communication device, the above-cited transmission frame format is different.

Also, a communication device that achieves the tasks of the present invention is characterized in that, in a data communication system, in which a plurality of communication devices are connected via transmission paths, it notifies a transmission frame format to another communication device in the system, and transmits and receives data with the other communication device using the notified transmission frame format.

A communication device that achieves the tasks of the present invention is further characterized in that a transmission frame format is notified from another communication device in the system, and it transmits and receives data with the other communication device using the notified transmission frame format.

Furthermore, as one mode of a communication device that adheres to the present invention, in a data communication system, in which a plurality of communication devices are connected via transmission paths, at least one communication device of this plurality of communication devices is characterized in that it comprises an establishment means for variably establishing a transmission frame format, a means for variably assembling a transmission signal frame in accordance with a transmission frame format established by this establishment means, and a means for variably analyzing a received signal from another communication device.

As yet another mode of a communication device that adheres to the present invention, the above-described establishment means is characterized in that it establishes the above-described transmission frame format at initial communication prior to the transmitting and receiving of data between communication devices.

A method for transmitting and receiving data between communication devices that achieve the objects of the present invention described above is characterized in that it comprises an initial mode step for establishing synchronization; an initial communication mode step for communicating an established frame format from one communication device to another communication device; a synchronization wait mode step for establishing synchronization between this one communication device and another communication device via the established frame format; and a communicating mode step for transmitting and receiving data using this established frame format following the establishment of synchronization.

BRIEF DESCRIPTION OF THE DRAWINGS

FIG. 2 depicts a schematic illustrating an embodiment of a communication frame.

DESCRIPTION OF THE PREFERRED EMBODIMENTS

Embodiments of the present invention are described below with reference to the figures. Identical or similar parts depicted in the figures are explained by assigning them the same reference numbers or reference symbols.

Figure 1:
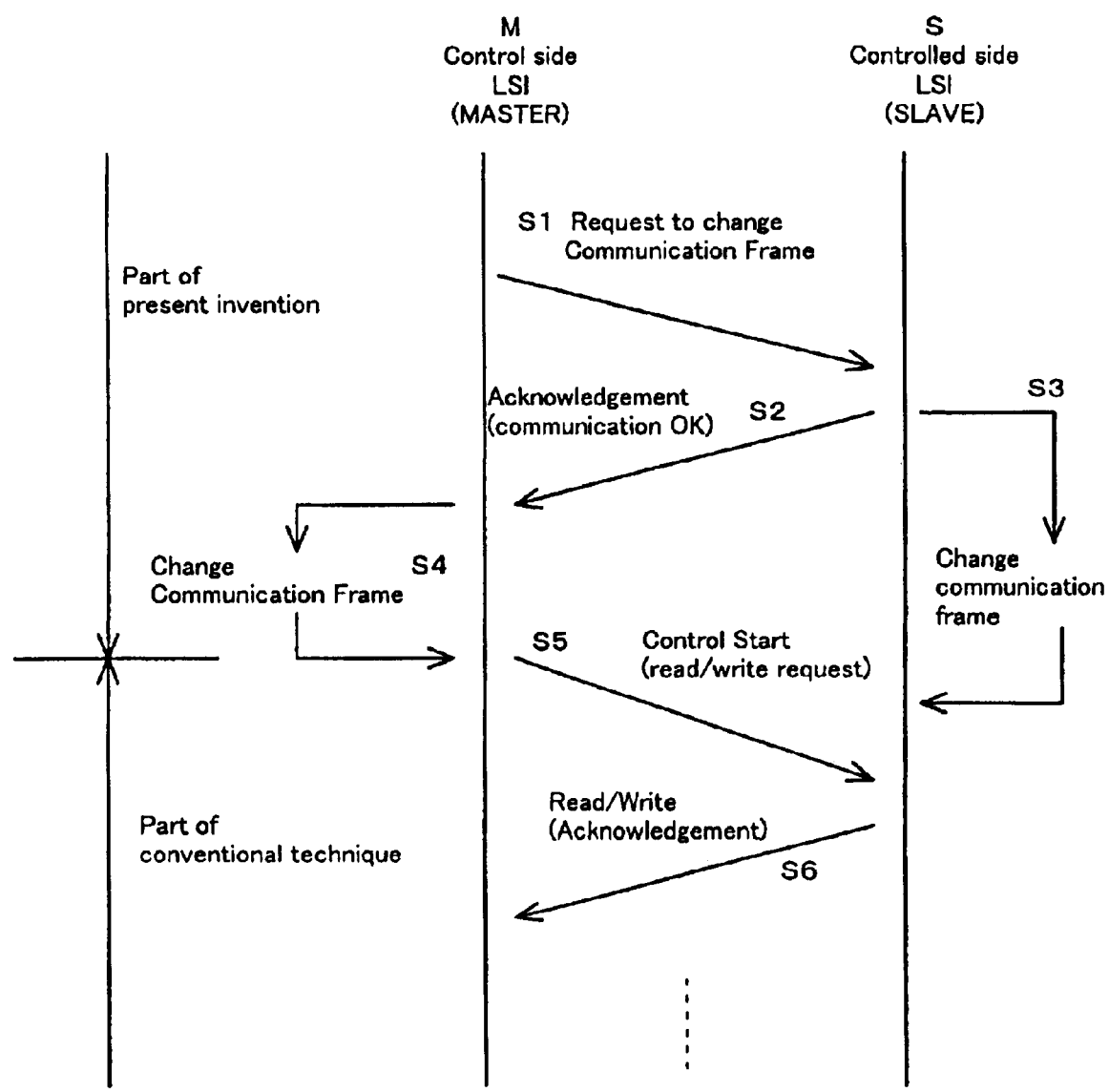
FIG. 1 depicts a schematic illustrating a fundamental communication protcol which adheres to the principle of the present invention.

FIG. 1 depicts a schematic diagram illustrating a fundamental communication protocol which adheres to the principle of the present invention. This schematic illustrates an operation sequence, which adheres to the present invention, for when data is transmitted between a control-side LSI (master) M and a controlled-side LSI (slave) S.

In FIG. 1, a request to change a communication frame is sent from a master M to a slave S (Step S1). Relative to this, an acknowledgment is sent from the slave S to the master M (Step S2). This enables confirmation that communications can be carried out between the master M and slave S.

As for the slave S, upon receiving a request from the master M to change a communication frame, it changes the following communication frame in accordance with the request from the master M (Step S3). As for the master M, after receiving an acknowledgment from the slave S, it changes to the communication frame it requested (Step S4).

The flow to this point is new procedures added by the present invention. Therefore, when a communication frame has been commonly confirmed and established between the master M and slave S, next, a data read/write request (Step S5) and an acknowledgment thereto (Step S6) are alternately transmitted in accordance with the same procedures as in the past.

Figure 11:
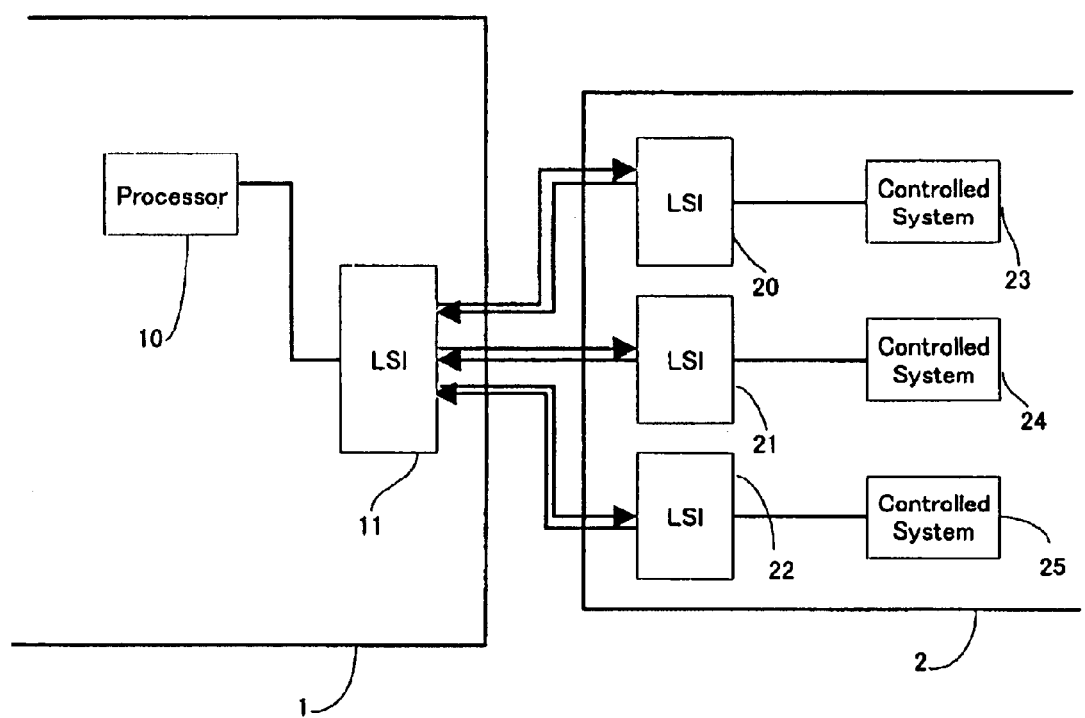
FIG. 11 depicts a conceptual schematic, which illustrates synchronous data communications being carried out between two printed board units.

In accordance with the above protocol illustrated in FIG. 1, in the configuration depicted in FIG. 11, LSI 11 becomes the master M, and LSI 20-22 become the slaves S. Therefore, in a configuration that adheres to the present invention depicted in FIG. 1, requests for communications frames can be made separately from LSI 11, which is the master M, to LSI 20-22, which are the slaves S.

FIG. 2 depicts a schematic illustrating an embodiment of a communication frame. FIG. 2A depicts a uplink communication frame sent from a master M to a slave S, and FIG. 2B depicts a downlink communication frame sent from a slave S to a master M.

Each frame for both the uplink and the downlink comprises 63 bits. The meaning of each bit is as follows. The $63^{rd}$ bit PLT is the pilot signal. This is a frame stack monitoring bit, which alternates back and forth between 1, 0 each frame. The $62^{nd}$ bit RST is a reset signal from a master M to a slave S, and is not used on the low order side.

The $61^{st}$ bit ACT indicates the validity of UI-UL, DI-DL data. UI expresses the clock length of one frame of a uplink communication frame, expressed as $2^{UI}$ bits (For example, if UI=6, then $2^6$=64 bits (clock)).

UJ is the clock length of the control frame of a uplink communication frame, but this is not used in the present invention. UK is the clock length of the SDSCAN data of a uplink communication frame, expressed as $2^{UK}$ bits. UL is the clock length of the DMA data of a uplink communication frame, expressed as $2^{UL}$ bits.

DI-DL are low order data, and correspond to UI-UL, respectively. ACK is a response bit indicating the slave S side acknowledges DI-DL, UI-UL. PTY is an error monitoring odd parity for bits 1–63.

The request from a master M to a slave S to change a communication frame illustrated in FIG. 1 is performed using the frame depicted in FIG. 2A in which the meaning of each bit is as described above. Relative to this, when an acknowledgment is sent from a slave S to a master M, information sent from the master M is copied as-is, and sent back by setting the acknowledgment bit ACK to an active state "1"".

That is, when data is transmitted between a master M and a slave S, the frame change can be controlled by the UK, UL of a frame to be sent from a master M corresponding to the nature of the data to be sent. Therefore, in data communications, the data volume/data length, or data volume/data velocity ratio can be changed as needed via the present invention.

Figure 3:
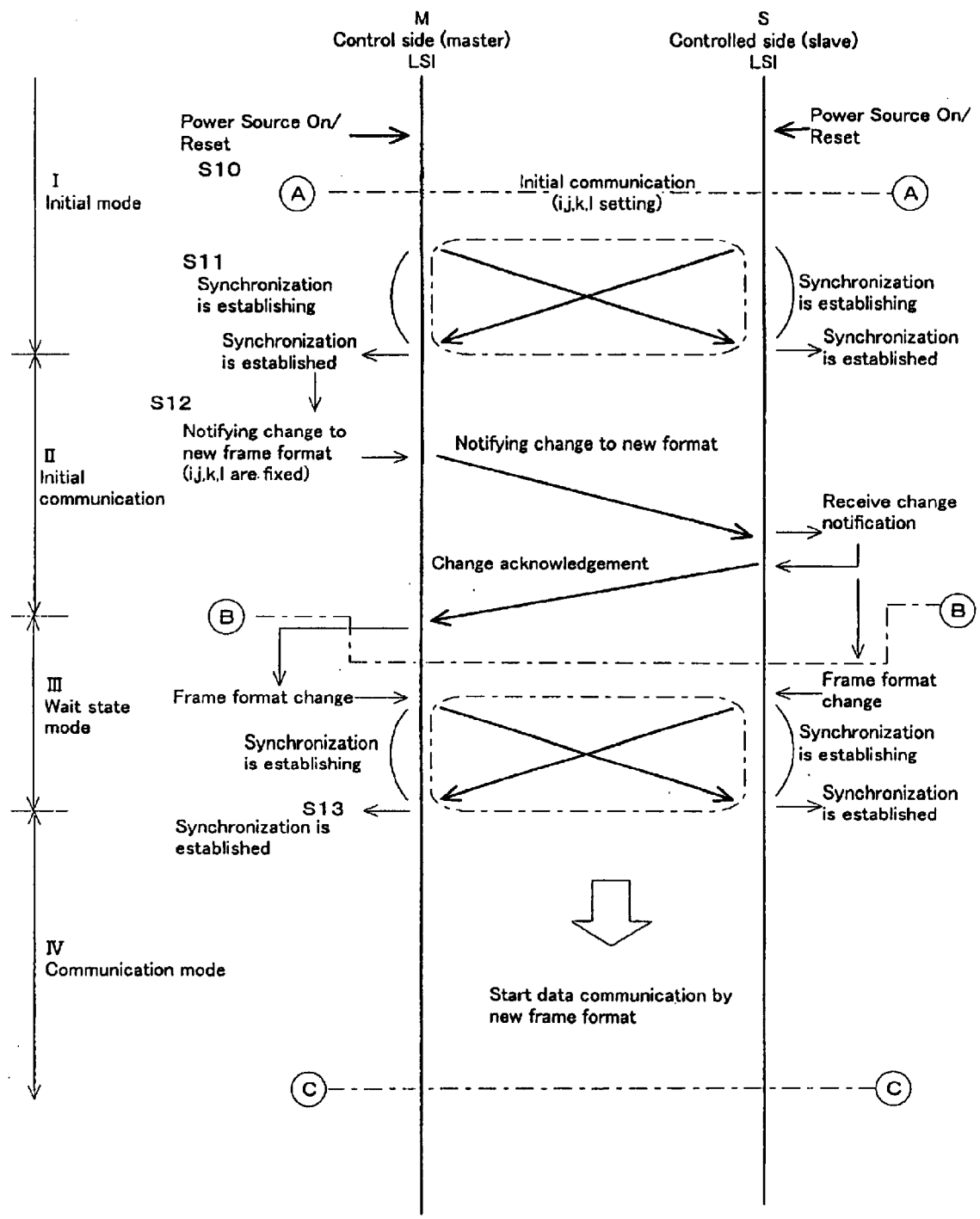
FIG. 3 depicts a detailed normal state communication protocol between a master M and a slave S when the frame format depicted in FIG. 2 is used.
Figure 4:
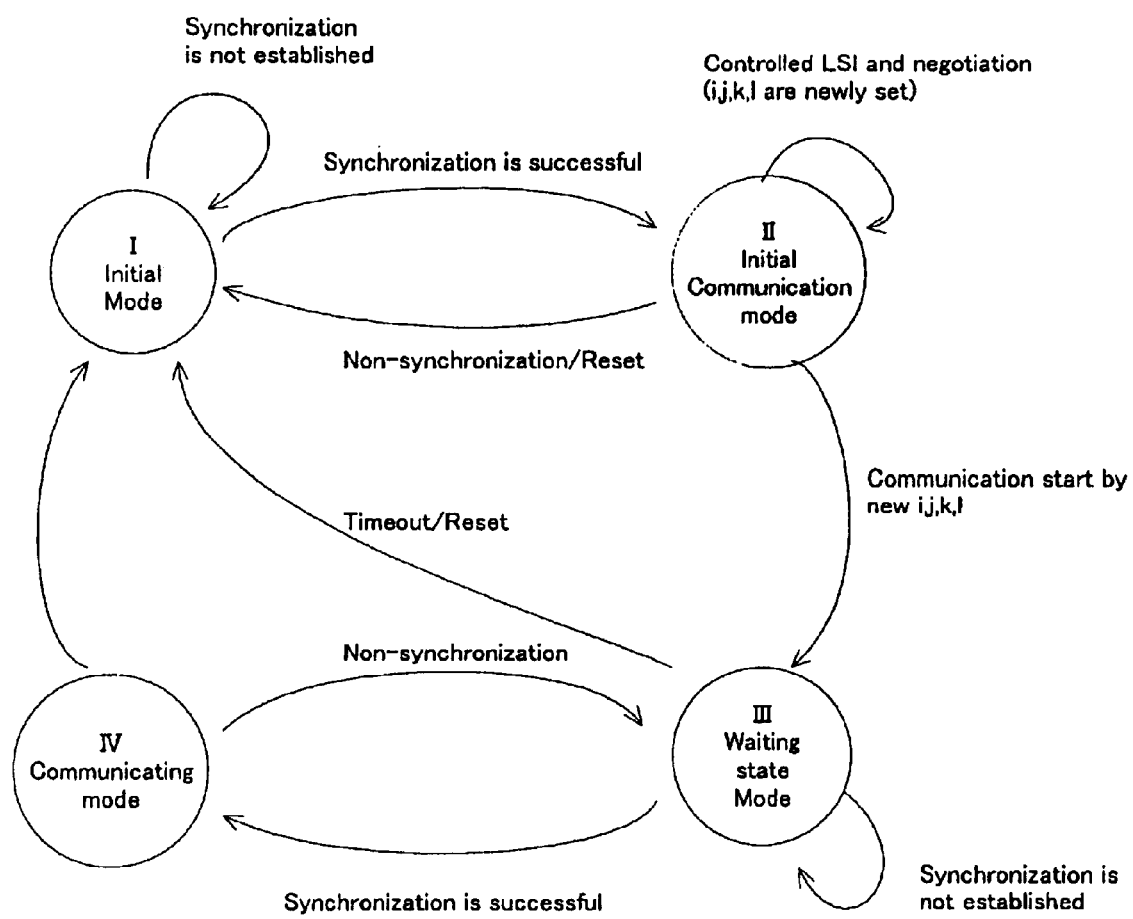
FIG. 4 depicts a state transition schematic corresponding to the communication protocol depicted in FIG. 3.

FIG. 3 depicts a detailed normal state communication protocol between a master M and a slave S when the frame format depicted in FIGS. 2A and 2B are used. FIG. 4 depicts a state transition schematic diagram corresponding to the communication protocol depicted in FIG. 3. The contents of the protocol depicted in FIG. 3 are explained below with reference to the modes depicted in FIG. 4.

In the initial mode I, power is turned ON for both the master M and slave S, and the state setting is reset (Step S10). Next, synchronization establishment processing is performed by fixing UI-UL and DI-DL using i, j, k, l (i=j+k+l), which have been set in advance for the initial setting (Step S11).

When synchronization is established, the-initial mode I ends. Following the initial mode I is the initial communication mode II. The existence of this initial communication mode II is characteristic of the present invention.

That is, as illustrated in FIG. 2, frame change data is notified to and confirmed by a slave in accordance with the UI-UL from a master M (negotiation), and the change to a new format (a new i, j, k, l setting) is carried out (Step S12). Then, communication format change processing in this initial communication corresponds to the process depicted in Steps S1–S3 in FIG. 1.

When a new format is negotiated and established between a master M and a slave S via the initial communication mode II, the synchronization wait state mode III begins, and synchronization is established with a new format (Step S13).

When synchronization is established via Step S13, the communicating mode IV begins, and data communications commence using a new frame structure.

Figure 5:
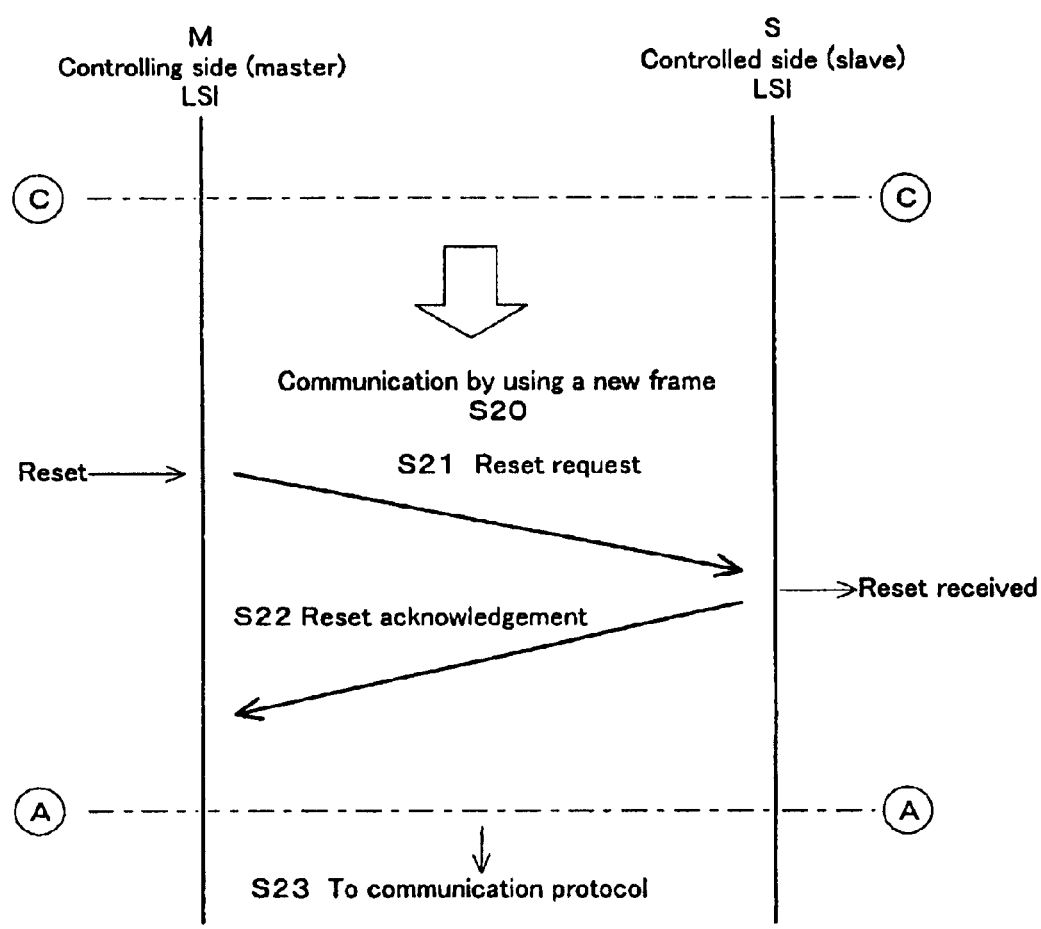
FIG. 5 is a sequence flowchart from the communicating mode IV, a reset operation is used to transition to the initial mode I.

At this point, when the communication format is changed anew from the communicating mode IV, a reset operation is used to transition to the initial mode I. This sequence is illustrated in FIG. 5.

During communications using an established communication format (Step S20), when there is a reset request from the master M side (Step S21), a reset acknowledgment is sent from a slave S in response to this (Step S22). At this time, the state is shifted to the initial mode as shown in the state transition schematic depicted in FIG. 4, new UI-UL are transmitted, and the communication process repeats from the initial mode processing depicted in FIG. 3 (Step S23).

Figure 6:
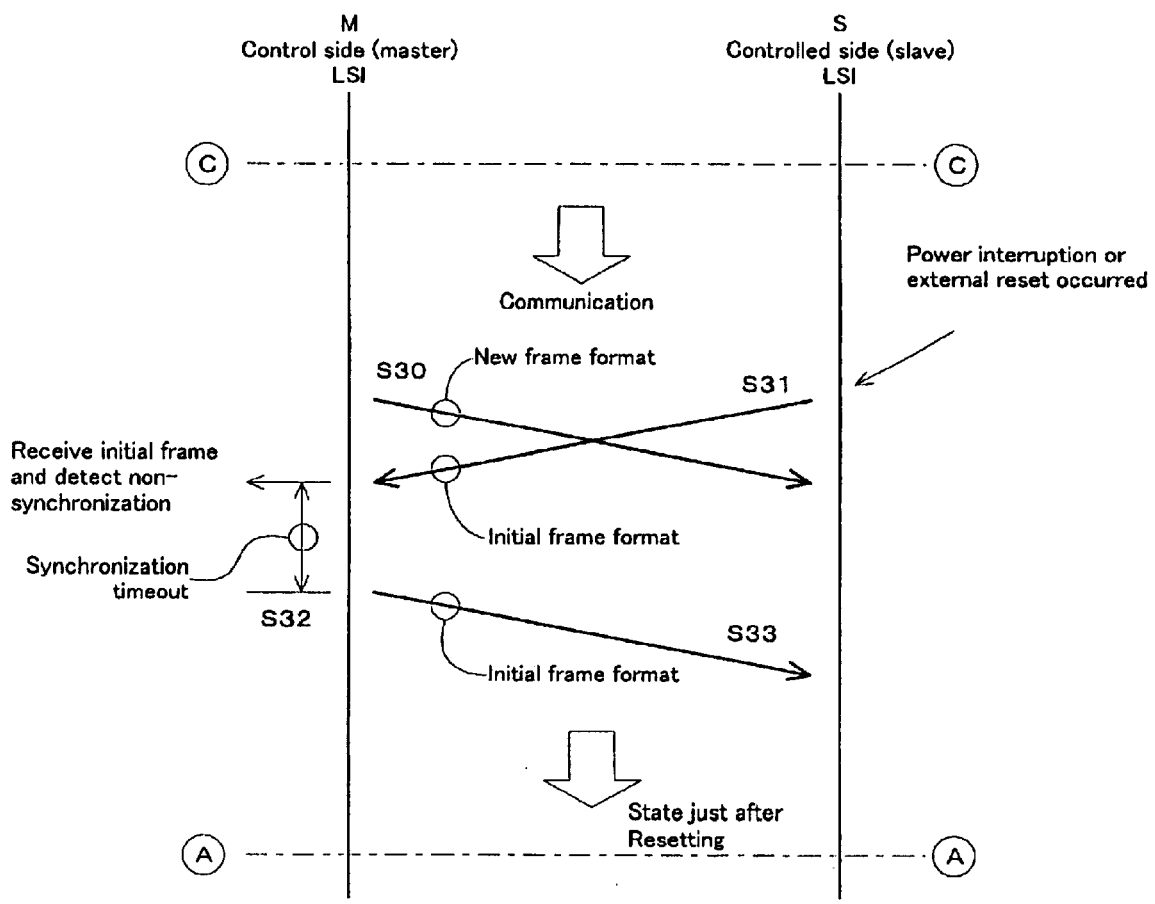
FIG. 6 is a schematic diagram depicting the process flow in the communicating mode IV when synchronization does not take place.

Further, FIG. 6 is a schematic diagram depicting the process flow in the communicating mode IV when synchronization does not take place. While communicating with a new frame format (Step S30), for example, when a power interruption or external reset occurs in a slave S, data is sent from the slave S to the master M with the initial frame format (Step S31).

In accordance with this, the master M receives the initial frame and detects non-synchronization. Therefore, the system transitions to the synchronization wait mode III. At this point, if synchronization is not established within a predetermined interval of time, synchronization wait times out (Step S32).

Therefore, the synchronization wait mode III is shifted to the initial mode I, and data is sent from the master M to a slave S with the initial frame format depicted in FIGS. 2A and 2B (Step S33). Subsequent processing continues on to the process illustrated in FIG. 3.

Figure 7:
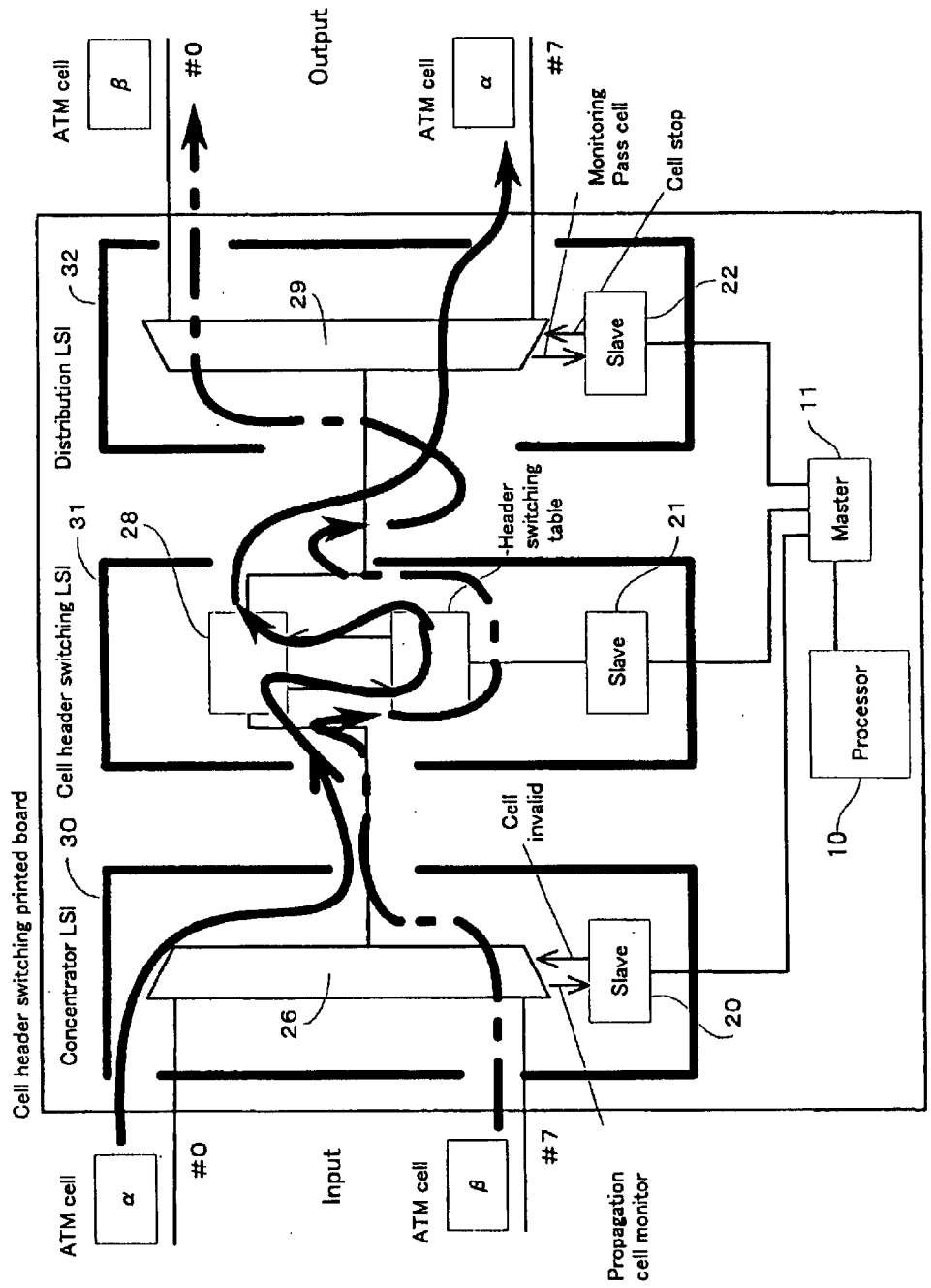
FIG. 7 is a schematic diagram of a configuration comprising the relationship between the above-described control side LSI, which is the master M, and controlled side LSI, which are the slaves S, illustrating an example of an application of the present invention.

FIG. 7 is a schematic diagram of a configuration comprising the relationship between the above-described control side LSI, which is the master M, and controlled side LSI, which are the slaves S, illustrating an example of an application of the present invention. More particularly, FIG. 7 is an example of an element, comprising the cell header switching function in an asynchronous transfer mode (ATM) switch, being mounted onto a single printed board.

A cell header switching printed board comprises a line concentrator LSI 30, a header switching LSI 31 and a distribution LSI 32. Each functional element comprises a controlled LSI 20, 21 and 22, which carries out data communications with a control side LSI 11.

The line concentrator LSI 30 comprises a controlled side LSI 20 and a line concentration functional element 26, and inputs eight lines (#0–#7) worth of ATM cells. ATM cells inputted by the concentrator functional element 26, e.g. concentrated ATM cells, are inputted to the header switching LSI 31.

In the line concentrator LSI 30, the slave S 20, which controls the concentrator functional element 26, counts propagating cells and cells in which bit errors occur. The slave 20 also arbitrarily invalidates lines.

The header switching LSI 31 comprises a controlled side LSI 21, a header switching table 27, and a header switching element 28, and switches the header of a cell. A header is switched by the header switching element 28 in accordance with the switching table 27, which is comprised of random access memory (RAM).

After that, in the distribution LSI 32, headers are distributed and outputted to the corresponding line #0–#7 by a distribution element 29, which is controlled by a controlled side LSI 22 in accordance with the switched headers. Furthermore, the controlled side LSI 22 of the distribution LSI 32 also counts propagating cells, and arbitrarily terminates cell output lines.

A processor 10 connected to the control side LSI 11 of the cell switching printed board collects cell monitoring data acquired by the controlled side LSI 20, 22. Then, based on the collected monitoring data, the propagation and outputting of cells are controled in real-time.

Here, the data volume and data velocity of the data communications between the control side LSI 11 and controlled side LSI 20–22 are now considered. The line concentrator LSI 30 and distribution LSI 32 only require SCN/SD data. By contrast, the header switching LSI 31 must access the RAM header switching table 27, and therefore, require a greater volume of DMA data than SCN/SD data. Therefore, the ratio of SCN/SD data is larger in data communications between the control side LSI 11 and the controlled side LSIs 20 and 22, and a communication format must be established that increases the data transmission rate.

Conversely, the ratio of DMA data is greater than the SCN/SD data between the control side LSI 11 and the controlled side LSI 21, requiring the establishment of a communication format that increases data communication volume.

So as to cope with this necessity, a corresponding communication format is established from the control side LSI 11 to the controlled side LSIs 20–22 by the initial communication mode II as illustrated in FIG. 3 and FIG. 4. Furthermore, in the configuration depicted in FIG. 7, for example, when a processor 10 communicates anew with another station or host station in a state, wherein primarily alarm data is collected by an alarm collector not shown in the figure, the control side LSI 11 must change the communication format so as to reduce the ratio of SCN/SD data communicated, and increase the volume of DMA data communicated.

Figure 8:
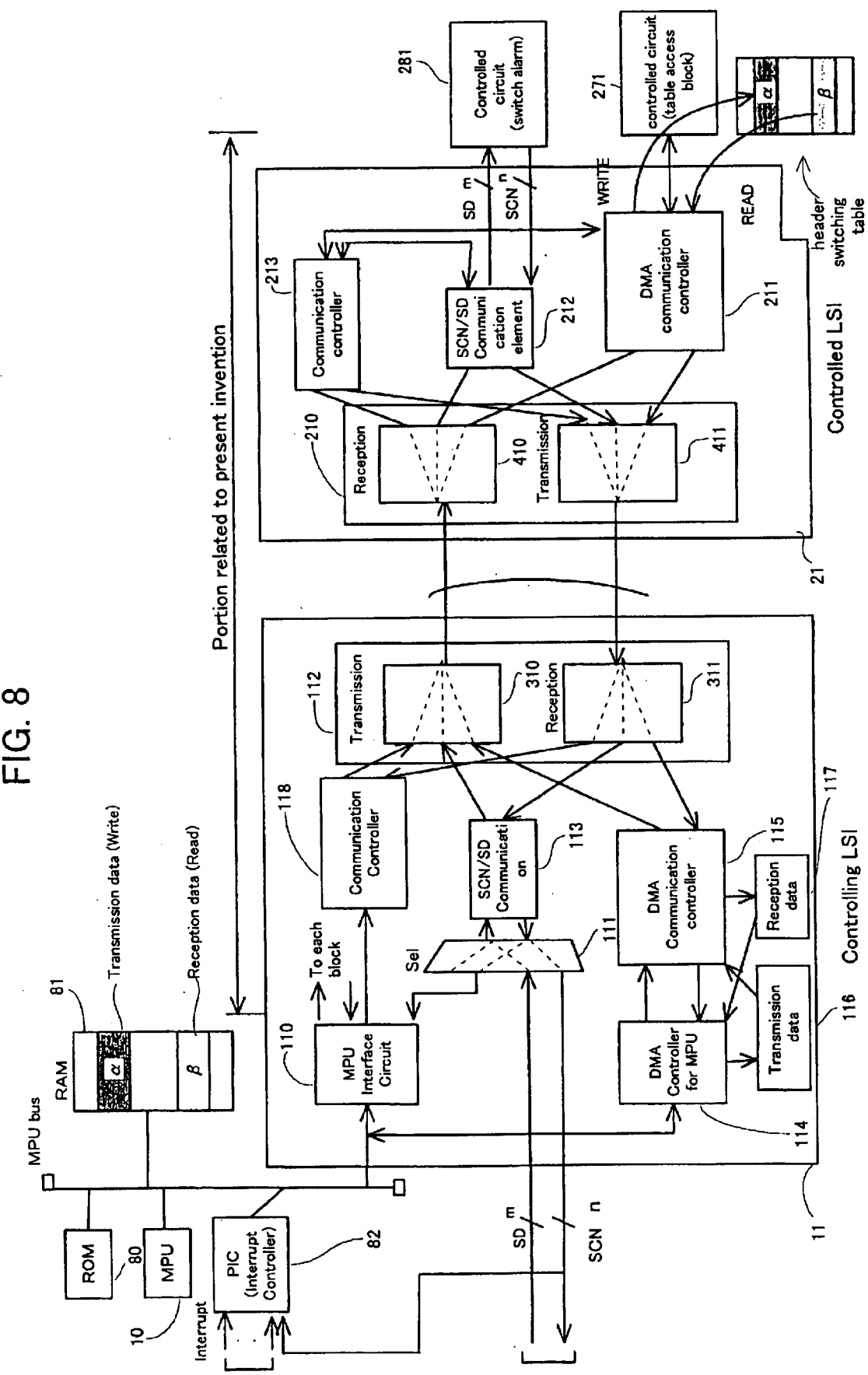
FIG. 8 is a block diagram of an embodiment depicting the relationship between the processor 10, control side LSI 11, and controller 21 comprising header switching LSI 31 in FIG. 7.

FIG. 8 is a block diagram of an embodiment depicting the relationship between the processor 10, control side LSI 11, and controller 21 comprising header switching LSI 31 in FIG. 7. In FIG. 8, the processor 10, e.g. microprocessor, is connected to the control side LSI 11, which is the master side LSI, via an MPU bus. A read-only memory (ROM) 80, storing a control program, a RAM 81, storing transmission (write) data a and reception (read) data β, and an interrupt controller 82 are also connected to the MPU bus.

On the other hand, FIG. 8 depicts as controlled circuits in the controlled side LSI 21, which is the slave S LSI, a table access circuit 271, which controls access to the header switching table 27, and an alarm/system switch 281, which comprises part of the header switching functional element 28.

Between the control side LSI 11, which is the master M, and the controlled side LSI 21, which is the slave S, synchronous communication, possessing a variable frame structure characteristic of the present invention, is carried out as described above.

The flow of data in this configuration is described below.

DMA Data Write:

Here, the transmitted DMA data is the path establishment data α, which establishes a path for an ATM cell. Therefore, path establishment data a is established by the MPU 10, and stored in RAM 81 as transmission write data.

The MPU 10 sends a transmission request of the contents of the path establishment data α to a communication controller 118 via an MPU interface 110 of the control LSI 11, which is the master M side LSI. The MPU interface 110 analyzes the command from the MPU 10 at this time, and outputs a write request.

In the meantime, a DMA controller 114 for the MPU stores in a transmission buffer 116 path establishment data α, which is transmission buffer data in RAM 81.

A DMA communication controller 115 reads the path establishment data α from the transmission buffer 116, converts it in a transmission circuit 310 of a transceiver interface 112 in accordance with an already established frame structure, and sends it to a receiving circuit 410 of the controlled side LSI 21, which is the slave S side LSI.

The path establishment data α received by the receiving circuit 410 is sent to a DMA communication controller 211, and is further written to a header conversion table 27 via a controlled circuit 271.

DMA Data Read:

Next, the reading of path establishment data β, which is written into header conversion table 27 is described. A read request is sent from the MPU 10 via an MPU interface 110 to a communication controller 118. Then, a read request is carried out from a communication control block 118 via a transmission circuit 310 and receiving circuit 410 to a DMA communication controller 211. The DMA communication controller 211, which received the request, further outputs a read request to a controlled circuit 271.

The controlled circuit 271 reads the path establishment data β from the header conversion table 27, and sends it to a DMA communication controller 115 via a DMA communication controller 211, and a receiving circuit 311 of a transceiver interface 112 of the control side LSI 11.

Next, the path establishment data β sent to the DMA communication controller 115 is written to a receiving buffer 117. When the path establishment data β is written to the receiving buffer 117, the MPU 10 references that path establishment data β via a DMA controller for the MPU 114.

The above describes the flow of data in DMA data write, read, and DMA data transmission is controlled via DMA communication controllers 115, 211 in both the control side LSI 11 and controlled side LSI 21.

SD Data Write:

SD data is set from the MPU 10 either from left outside the schematic diagram depicted in FIG. 8, or via a selector 111. At this time, an SCN/SD communication element 113 sends SD data via a transmission circuit 310 to a receiving circuit 410 corresponding to the controlled LSI 21. The SD data is further transmitted from the receiving circuit 410 via an SCN/SD communication element 212 to a controlled circuit 281.

SCN Data Read

Alarm signal, system switching data and other SCN data from a controlled circuit 281 is received by an SCN/SD communication element 212 in the controlled LSI 21. Next, this data is transferred to an SCN/SD communication element 113 in the control side LSI 11 via a transmission circuit 411 in a transceiver interface 210, and a corresponding receiving circuit 311 in the control side LSI 11.

When there is a malfunction notification or some other interrupt signal, the SCN data is notified to an interrupt controller (PIC) 82 via a selector 111.

Further, when data is to be outputted externally, for example, in the case of light emitting diode (LED) control, the external circuit is driven as-is. In the case of data which notifies the MPU 10 of a state, notification is via a selector 111 and MPU interface 110.

FIG. 8 also illustrates the carrying out of the above-described synchronous communication with a variable frame structure between the control LSI 11 and controlled LSI 21.

Figure 9:
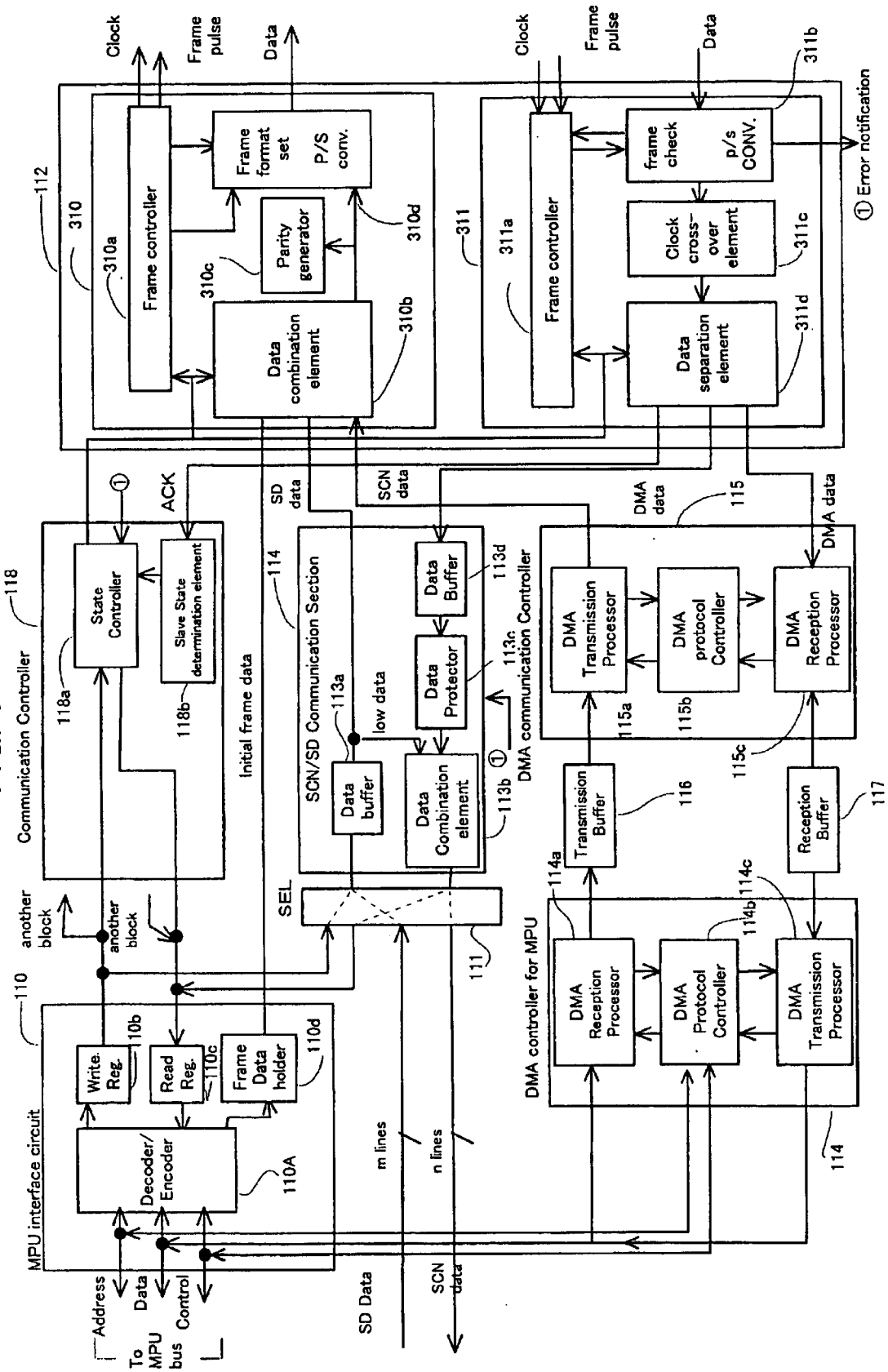
FIG. 9 a block diagram of an example of the detailed configurations of the controlled side LSI 11, respectively, depicted in FIG. 8.
Figure 10:
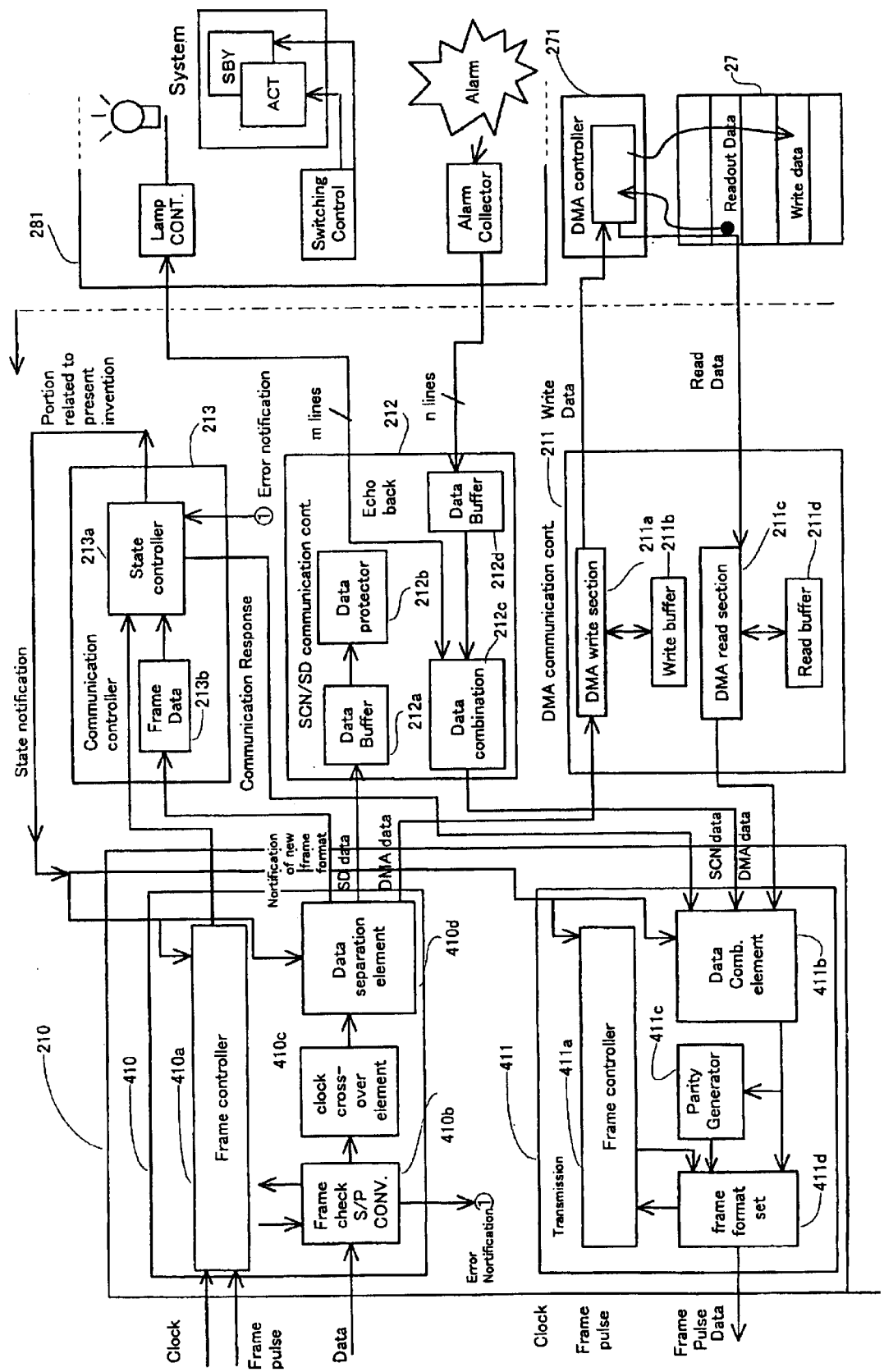
FIG. 10 a block diagram of an example of the detailed configuration of the controlled side LSI 21, depicted in FIG. 8.

FIG. 9 and FIG. 10 are block diagrams of examples of the detailed configurations of the control side LSI 11 and controlled side LSI 21, respectively, depicted in FIG. 8. The operation of each is described according to each mode depicted in the state transition schematic in FIG. 4.

First of all, in the control side LSI 11 depicted in FIG. 9, an MPU interface 110 transmits and receives addresses, data and control signals via an MPU bus (refer to FIG. 8). For SD data, m lines, and for SCN data, n lines are connected to a selector 111.

A transceiver interface 112 comprises a transmission circuit 310 and a receiving circuit 311, and each of these comprises a clock signal, frame pulse and interface function for the sending and receiving of data with the controlled LSI 21.

Initial Mode I:

The communications format explained in FIGS. 2A and 2B are used in initial communications. An initial frame structure is defined beforehand under MPU control in a frame data holder 110d in the MPU interface 110. By using this definition, the transmission data format depicted in FIG. 2A is assembled in a frame assembly and P/S converter 310d under the control of a frame controller 310a of a transmission circuit 310 in the transceiver interface 112 of the control LSI 11.

Meanwhile, the return data depicted in FIG. 2B, which is sent back from the controlled LSI 21, is analyzed by a frame check and P/S converter 311b of a receiving circuit 311 of the control LSI 11, synchronization establishment is recognized, and then the system transitions to the initial communication mode. When synchronization establishment cannot be recognized within a predetermined time interval, an error message is inputted to the state controller 118a of the communication control block 118.

Figure 12:
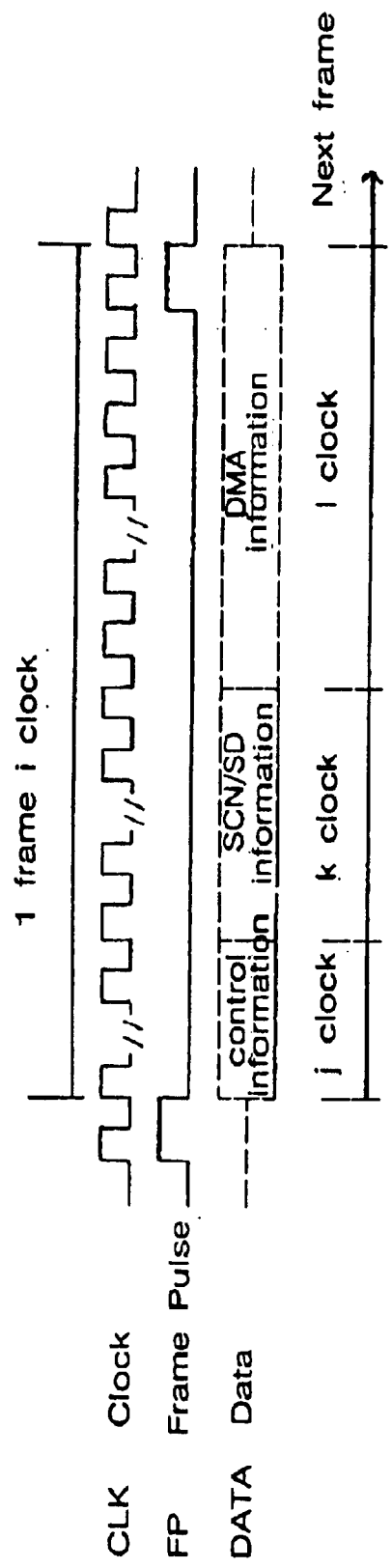
FIG. 12 depicts a synchronous-type communications format for the communications of FIG. 11.

Initial Communication Mode II:

The data contents of an initial communication, e.g. the number of clocks in a new frame (j, k, l in FIG. 12) and the new frame structure (contents shown in FIGS. 2A and 2B), are set by the MPU 10 via a write register 110b of the MPU interface 110 in a state control block 118a of a communication controller 118. These settings are validated in a state controller 118a of a communication controller 118, and notified to the controlled side LSI 21. Meanwhile, when a slave state determination element 118b inside a communication controller 118 recognizes a new frame via a receiving circuit 311 from the controlled side LSI 21, a selection signal connects to the new format side, and when non-synchronization is recognized by a received data separation element 311d, a synchronization establishment signal state is set to the initial mode.

Synchronization Wait Mode III:

This mode waits for synchronization establishment in a new format the same as the initial mode I. If synchronization establishment is recognized in a frame check and P/S converter 311b, a state controller 118a notifies a communicating signal to an external terminal and to the MPU via a read register 110c in the MPU interface 110, and notifies the user that communications are enabled, and the system transitions to a communicating mode IV state. At this time, when synchronization is not established in a frame check and P/S converter 311b after a fixed interval of time, the system transitions to the initial mode II.

Communicating Mode:

When non-synchronization is recognized by a frame check and P/S converter 311b of a receiving circuit 311, the synchronization establishment signal becomes inactive, and if synchronization is not re-established, the system transitions to the initial mode I state.

Moreover, when reset is entered in any of the mode states described above, the system unconditionally transitions to the initial mode I state. Next, FIG. 10 is a block diagram depicting a detailed example of a configuration of a controlled side LSI 21. More particularly, it comprises a configuration that implements the variable format control of the present invention. The control side LSI 11 transceiver interface 210 is also configured identical to the control side LSI 11 transceiver interface 111, and comprises a receiving circuit 410 and a transmission circuit 411.

Initial Mode I:

At initial communication, the initial state communication frame (format) depicted in FIG. 2 is used, and is received by a receiving circuit 410. In the receiving circuit 410, a clock and frame pulse are received by a frame controller 410a.

Data is received by a frame check and P/S converter 410b, and synchronized with the clock and frame pulse received by the frame controller 410a. If not received, an error notification is sent to a state controller 213a in a communication controller 213.

Initial Communication Mode II:

When data is received normally by a frame check and P/S converter 410b inside a receiving circuit 410, the received frame is analyzed in a clock cross-over element 410c, and is switched over to an LSI internal clock. After that, a new frame structure is detected by a data separator 410b, and the contents thereof are notified to a frame data element 213b in a communication controller 213.

When the communication controller 213 recognizes the new frame, it sends a notification response to a data combination element 411b in a transmission circuit 411. Therefore, as described above with reference] to FIG. 2, a notification response bit ACK is placed in the initial frame by a frame assembler 411d and notified to the control side LSI 11.

Synchronization Wait Mode III:

A receive enabled state is notified to a receiving circuit 410 and transmission circuit 411 from a state controller 213a in the communication controller 213, and synchronization wait is carried out using a new communication frame. In receiving with a new frame, when a frame check and S/P converter 410b detects that data is not received in synch with a clock and frame pulse, an error notification is sent to the state controller 213a of the communication controller 213.

At this time, when synchronization is not established after a predetermined time interval, the system transitions to the initial mode state I.

Communicating Mode:

Data sent in a new frame from the control side LSI 11 is sent from a data separator 410d to a data buffer 212a in an SCN/SD communication element 212. This data is accumulated in a data buffer 212a, protection such as shaping of noise-disturbed signals is performed by a data protector 212b, and in the controlled circuit 281, a control signal carries out lamp control, system switching control and other control operations.

Alarm signals from the controlled circuit 281 are accumulated in a data buffer 212c of the SCN/SD communication element 212. The data accumulated in the data buffer 212c is combined in a data combination element 212d with output from the data protector 212b.

CAN data combined and outputted by the data combination element 212d is shaped, and combined in a data combination element 411b of the transmission circuit 411 with DMA data from a DMA communication controller 211.

Furthermore, after an error code is appended in the parity generator 411c of the transmission circuit 411, the data is assembled into the frame format set in a frame assembly and P/S converter 411d and notified to the control side LSI 11. A clock and frame pulse are outputted from a frame controller 411a in synch with this data.

In the meantime, data transmitted in a new frame from the control side LSI 11 is sent from a data separator 410d to a DMA communication controller 211. Assembly and confirmation of the DMA data is carried out by a DMA write element 211a inside the DMA communication controller 211, and when normal, this data is written to memory 27 via a DMA controller 271, while being written once to a buffer 211b.

The reading and analyzing of the data from memory 27 is carried out via the DMA controller 271 by a DMA read element 211c. This data is notified to the transmission circuit 411, while being written once to a read buffer 211d. Then, the read-out DMA data, as described above, is combined with SCN data in a data combination element 411b, assembled into an established frame by a frame assembler 411d, and notified to the control side LSI 11.

At this point, when non-synchronization occurs during communication, this is recognized as an error, and notified to a state controller 213b of the communication controller 213 by a frame check and S/P converter 410b. When this non-synchronization happens, the system transitions to the synchronization wait mode III, and enters a communication synchronization wait state. Furthermore, when reset occurs during any of the above-described mode states, the system unconditionally transitions to the initial mode I.

The above description of the preferred embodiment describes data communications performed using the format depicted in FIGS. 2A and 2B when the upward and downward are in common. The present invention is not limited to this usage, and can also be used in different formats for each of the upward the upward and downward.

The preferred embodiment of the present invention was described above in accordance with the figures, and advantages offered by the present invention in terms of cost and quality are as follows.

That is, from the aspect of costs, since the present invention can be used universally in individual devices and communications, there is no need for new development. More particularly, the design of LSI in recent years has been carried out primarily in the VHDL language. Consequently, software can be readily used and reused as a common asset.

From the standpoint of the firmware and software, the control system has consistency, and there is no need to develop a new module.

The present invention also enables efficient use of communication bandwidth, making it possible to avoid the waste involved with either SCN/SD data or DMA data when communications are carried out by matching one of these data to the other in terms of bandwidth. More particularly, it is even more effective with a device, such as an ATM switch, which is connected to and operates at high speed with various devices and LSIs.

Furthermore, from the aspect of quality, both the hardware and firmware can be used as common assets, thus ensuring stable quality, by employing the present invention.

As another effect of the present invention, it is an extremely simpler mechanism than those of conventional DMA communications and packet communications, and makes possible communication bandwidth settings that meet a variety of characteristics.

What is claimed is:

1. A data communication system, comprising:

a first communication device; and at least one second communication device, connected to said first communication device via a transmission path, said first communication device notifying a transmission frame format to said second communication device, and said first communication device and said second communication device transmitting and receiving data using said notified transmission frame format, wherein said transmission frame format includes a predetermined bit length; and a ratio of a first characteristic data and a second characteristic data can be arbitrarily set to any of a plurality of different ratios inside said predetermined bit length frame.

2. The data communication system according to claim 1, wherein:

said first characteristic data and second characteristic data are direct memory access (DMA) data and Scan Data/Send Data (SCN/SD data), respectively.

3. The data communication system according to claim 1, wherein:

when sending data from said first communication device to said second communication device, said transmission frame format differs from when sending data from said second communication device to said first communication device.

4. A data communication system, comprising:

a first communication device; and a plurality of second communication devices, connected to said first communication device via a transmission path, said first communication device notifying each of said plurality of second communication devices of respective corresponding transmission frame formats, and said first communication device and each of said plurality of second communication devices transmitting and receiving data using corresponding said notified transmission frame formats, wherein said transmission frame format includes a predetermined bit length; and a ratio of a first characteristic data and a second characteristic data can be arbitrarily set to any of a plurality of different ratios inside said predetermined bit length frame.

5. The data communication system according to claim 4, wherein:

said first characteristic data and second characteristic data are direct memory access (DMA) data and Scan Data/Send Data (SCN/SD data), respectively.

6. The data communication system according to claim 4, wherein:

when sending data from said first communication device to said second communication device, said transmission frame format differs from when sending data from said second communication device to said first communication device.

7. A communication device in a data communication system including a plurality of communication devices connected via transmission paths, wherein:

said communication device notifies a transmission frame format to another communication device; and transmits and receives data with said another communication device using said notified transmission frame format; and wherein said transmission frame format includes a predetermined bit length and a ratio of a first characteristic data and a second characteristic data can be arbitrarily set to any of a plurality of different ratios inside said predetermined bit length frame according to data volume and data speed of the first and second characteristic data.

8. A communication device in a data communication system including a plurality of communication devices connected via transmission paths, wherein:

the communication device is notified of a transmission frame format from a specified communication device; and transmits and receives data with said specified communication device using said notified transmission franc format, and wherein said transmission frame format includes a predetermined bit length; and a ratio of a first characteristic data and a second characteristic data can be arbitrarily set to any of a plurality of different ratios inside said predetermined bit length frame according to data volume and data speed of the first and second characteristic data.

9. A communication device in a data communication system including a plurality of communication devices connected via transmission paths, comprising:

establishment means for variably establishing a transmission frame format;

means for variably assembling a transmission signal frame in accordance with a transmission frame format established by said establishment means; and means for variably disassembling a signal frame received from said another communication device in the system, wherein said transmission frame format includes a predetermined bit length; and a ratio of a first characteristic data and a second characteristic data can be arbitrarily set to any of a plurality of different ratios inside said predetermined bit length frame according to data volume and data speed of the first and second characteristic data.

10. The communication device according to claim 9, wherein:

said establishment means establishes said transmission frame format at initial communication prior to the transmission and reception of data to and from another communication device in the system.

11. A method for transmitting and receiving data between communication devices, comprising:

an initial mode step for establishing synchronization;

an initial communication mode step for notifying an established frame format from one communication device to another communication device;

a synchronization wait mode step for establishing synchronization with an established frame format from said one communication device to another communication device; and a communicating mode step for transmitting and receiving data using said established from format from said one communication device to another communication device after synchronization establishment, wherein said transmission frame format includes a predetermined bit length; and a ratio of a first characteristic data and a second characteristic data can be arbitrary set to any of a plurality of different ratios inside said predetermined bit length frame according to data volume and data speed of the first and second characteristic data.

* * * * *